United States Patent
Mizuno et al.

(10) Patent No.: US 7,813,946 B2
(45) Date of Patent: Oct. 12, 2010

(54) TELEVISION AND LIFETIME ESTIMATING METHOD OF A TELEVISION

(75) Inventors: Bunji Mizuno, Ikoma (JP); Toru Fukumoto, Kyoto (JP); Shinichi Yamamoto, Hirakata (JP); Junichi Onoue, Nara (JP)

(73) Assignee: Panasonic Corporation, Osaka (JP)

( * ) Notice: Subject to any disclaimer, the term of this patent is extended or adjusted under 35 U.S.C. 154(b) by 1150 days.

(21) Appl. No.: 10/070,056

(22) PCT Filed: Jun. 28, 2001

(86) PCT No.: PCT/JP01/05604

§ 371 (c)(1),
(2), (4) Date: Nov. 8, 2002

(87) PCT Pub. No.: WO02/01445

PCT Pub. Date: Jan. 3, 2002

(65) Prior Publication Data

US 2003/0139981 A1     Jul. 24, 2003

(30) Foreign Application Priority Data

Jun. 29, 2000  (JP) .............................. 2000-197417

(51) Int. Cl.
  *G06F 17/50*  (2006.01)
  *H01L 21/66*  (2006.01)
(52) U.S. Cl. ........................................... 705/7; 438/17
(58) Field of Classification Search ...................... 705/7; 327/524
See application file for complete search history.

(56) References Cited

U.S. PATENT DOCUMENTS

| | | | | | |
|---|---|---|---|---|---|
| 3,697,873 | A | * | 10/1972 | Mazur | 324/765 |
| 4,090,132 | A | * | 5/1978 | Alexander | 324/767 |
| 4,331,977 | A | * | 5/1982 | Cohn et al. | 348/725 |
| 5,441,160 | A | * | 8/1995 | DeWoolfson et al. | 209/702 |
| 5,877,692 | A | * | 3/1999 | Watanabe et al. | 340/679 |
| 6,295,423 | B1 | * | 9/2001 | Haines et al. | 399/24 |
| 6,524,872 | B1 | * | 2/2003 | Cheung | 438/17 |
| 6,633,177 | B1 | * | 10/2003 | Okada | 324/765 |
| 7,054,824 | B1 | * | 5/2006 | Grenchus et al. | 705/7 |
| 2001/0034663 | A1 | * | 10/2001 | Teveler et al. | 705/26 |
| 2002/0001001 | A1 | * | 1/2002 | Rousseau et al. | 346/103 |

(Continued)

OTHER PUBLICATIONS

Frank Den Hond, Technology Analysis & Strategic Management. Abingdon: Dec. 1998. vol. 10, Iss. 4; p. 529, 15 pgs).*

(Continued)

*Primary Examiner*—Matthew S Gart
*Assistant Examiner*—Garcia Ade
(74) *Attorney, Agent, or Firm*—Snell & Wilmer L.L.P.

(57) ABSTRACT

The commodity recycling method of the present invention includes the steps of: selling or renting a commodity to a first user (step S1); collecting the commodity from the first user (step S2); estimating a remaining life of the commodity based on information indicating a usage history of the commodity recorded in a recording section provided in the commodity (step S3); determining sale terms or lease terms based on the estimated remaining life of the commodity (step S4); selling or renting the commodity to a second user in accordance with the sale terms or the lease terms (step S5). The recording section records the information indicating the usage history of the commodity in a manner in which it is substantially impossible for a user of the commodity to alter the usage history information.

7 Claims, 11 Drawing Sheets

OTHER PUBLICATIONS

The similarity and heterogeneity theses in studying innovation Evidence from the end-of-life vehicle case by Frank Den Hond. Technology Analysis & Strategic Management. Abingdon: Dec. 1998. vol. 10, Iss. 4; p. 529, 15 pgs.*

* cited by examiner

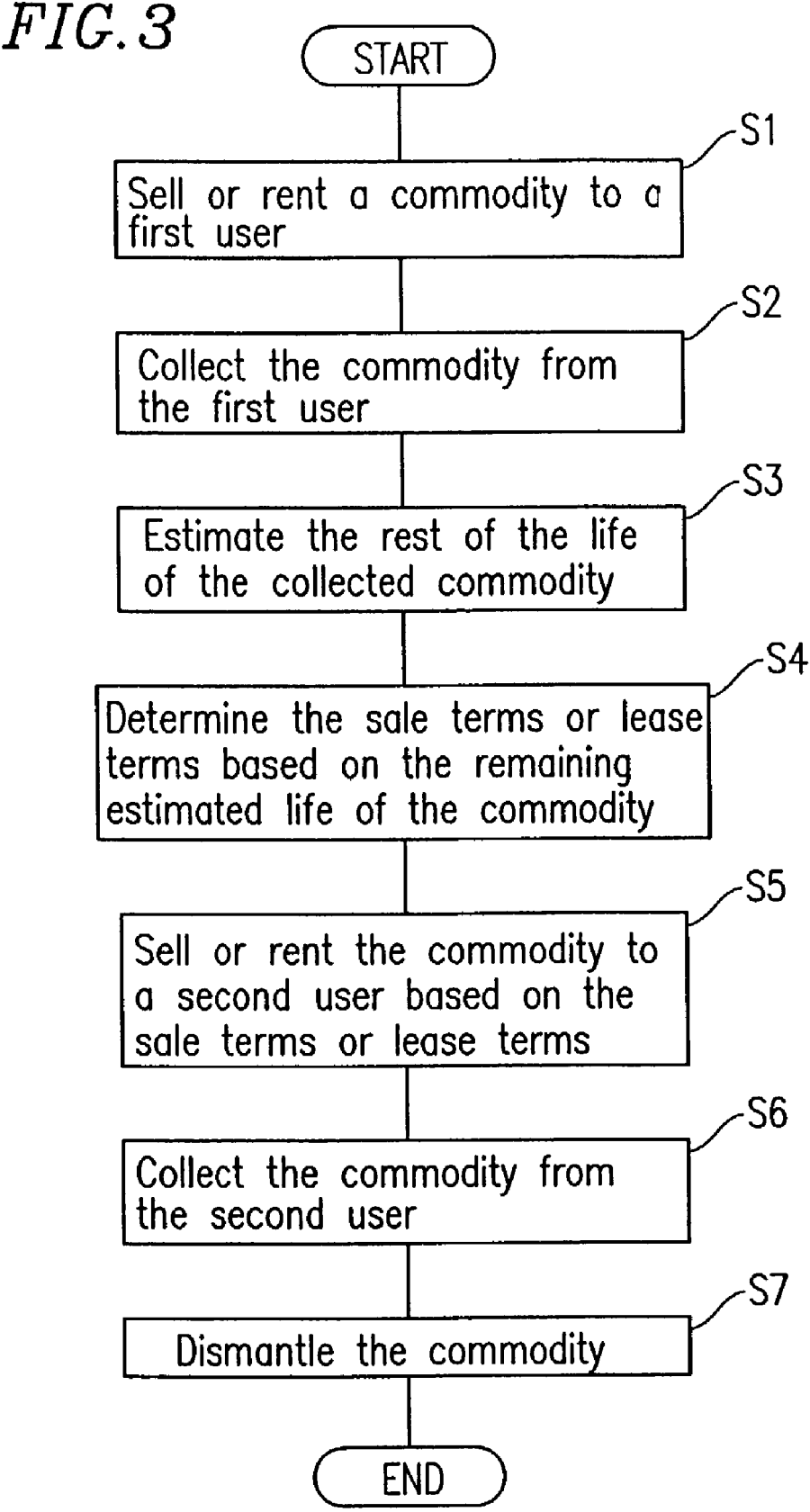

TELEVISION AND LIFETIME ESTIMATING METHOD OF A TELEVISION

TECHNICAL FIELD

The present invention relates to a commodity recycling method.

BACKGROUND ART

Conventionally, commodities, such as home-use electronic and electric devices, produced and sold on a massive scale in the world have been disposed of on a massive scale. In order to decrease the effect on the environment of such massive disposal, the following measures (1) and (2) have been often taken.

(1) Select a place for disposing of a commodity according to the properties of the commodity. For example, a commodity which may be harmful to humans is landfilled in a place distant from a city, and a commodity which may not be harmful to humans is landfilled on the outskirts of a city.

(2) Change the form of a commodity into a form which may not have any effect on the environment, and then the commodity is disposed of. For example, flon, which is one of the causes in disruption of the ozone layer, is removed from the commodity, and then the commodity is disposed of.

However, these measures are merely ad hoc. Therefore, a fundamental measure for decreasing the effect on the environment of disposed commodities by reducing the amount of commodity disposal has been expected.

Reducing an amount of commodity disposal by recycling commodities is one typical example of such fundamental measures.

In 2001, the "Home Appliances Recycling Law" was enforced in order to reduce the amount of home-use electronic and electric devices (hereinafter, referred to as "home appliances") disposal by encouraging the recycling of the home appliances. This law requires manufacturers of a particular types of home appliances to collect, dismantle, and rebuild the home appliances of that particular type.

Home appliances, which are currently distributed, require manual labor when they are dismantled into a plurality of parts, because most of the home appliances are not designed to accommodate automatic dismantling. This means that the dismantlement cost of home appliances is significantly higher than their manufacturing cost. As a result, the dismantlement cost of home appliances is added to their selling price. Thus, there is a possibility that consumers will have to pay more to purchase the home appliances.

The Applicant of the present application estimates that it will take at least a few to 10 years or more after the enforcement of the "Home Appliances Recycling Law" to entirely replace the home appliances currently distributed with home appliances which are designed so as to accommodate automatic dismantlement in a dismantling plant.

The objective of the present invention is to provide a recycling method which allows a decrease in an operation cost of the dismantling plant by reducing the amount of commodities (for example, home appliances) to be dismantled.

Another objective of the present invention is to provide a recycling method which implements a global recycling system for efficiently recycling commodities worldwide.

DISCLOSURE OF THE INVENTION

A commodity recycling method of the present invention comprises the steps of: selling or renting a commodity to a first user; collecting the commodity from the first user; estimating a remaining life of the commodity based on information indicating a usage history of the commodity recorded in a recording section provided in the commodity; determining sale terms or lease terms based on the estimated remaining life of the commodity; selling or renting the commodity to a second user in accordance with the sale terms or the lease terms; collecting the commodity from the second user; and dismantling the commodity into a plurality of parts after the collection of the commodity from the second user, wherein the recording section records the information indicating the usage history of the commodity in a manner in which it is substantially impossible for a user of the commodity to alter the usage history information, whereby the above objectives are achieved.

The sale and renting to the first user and the collection of the commodity from the first user may be performed in a first country, and the sale and renting of the commodity to the second user and the collection of the commodity from the second user may be performed in a second country, which is different from the first country.

The dismantling of the commodity into a plurality of parts may be performed in the second country.

Techniques for dismantling the commodity may be transferred from the first country to the second country.

A guidance on the techniques for dismantling the commodity may be provided in the second country.

The commodity may include a device for sending particular information which is particular to the commodity.

The particular information may include distribution information for specifying a party involved in a distribution of the commodity, and when the particular information from the commodity ceases, may notify a party involved in the distribution of the commodity, which is specified by the distribution information included in the most recent piece of particular information from the commodity, that the particular information from the commodity has ceased.

The step of estimating the remaining life of the commodity may comprise a step of obtaining the information indicating the usage history recoded in the recording section via a network.

Another commodity recycling method of the present invention comprises the steps of: selling or renting a commodity to a first user; collecting the commodity from the first user; selling or renting the commodity to a second user; collecting the commodity from the second user; and dismantling the commodity into a plurality of parts after the collection of the commodity from the second user, wherein the sale and renting to the first user and the collection of the commodity from the first user are performed in a first country, and the sale and renting of the commodity to the second user and the collection of the commodity from the second user are performed in a second country, which is different from the first country, whereby the above objectives are achieved.

The dismantling of the commodity into a plurality of parts may be performed in the second country.

Techniques for dismantling the commodity may be transferred from the first country to the second country.

A guidance on the techniques for dismantling the commodity may be provided in the second country.

The commodity may include a device for sending particular information which is particular to the commodity.

The particular information may include distribution information for specifying a party involved in a distribution of the commodity, and when the particular information from the commodity ceases, may notify a party involved in the distribution of the commodity, which is specified by the distribution information included in the most recent piece of particular information from the commodity, that the particular information from the commodity has ceased.

Another commodity recycling method of the present invention comprises the steps of: selling or renting the commodity to a first user in a first country; collecting the commodity from the first user in the first country; and exporting the commodity for sale or rental in a second country, which is different from the first country, whereby the above objectives are achieved.

Another commodity recycling method of the present invention comprises the steps of: importing a commodity sold or rented to a first user and collected from the first user in a first country into a second country, which is different from the first country; selling and renting the commodity to a second user in the second country; and collecting the commodity from the second user in the second country, whereby the above objectives are achieved.

BRIEF DESCRIPTION OF THE DRAWINGS

FIG. 3 is a flow chart illustrating a procedure of the recycling method according to the present invention.

BEST MODE FOR CARRYING OUT THE INVENTION

As used herein, the term "sale" means "to transfer proprietary rights from A to B", and "rent" means "to make a monetary lend-lease contract between A and B without transferring proprietary rights from A to B". Herein, A and B may be either a natural person or a cooperation. Furthermore, the term "rent" encompasses "lease" and "rental".

The term "commodity" refers to any type of commodity. For example, commodities are cars, home appliances, and the like.

Hereinafter, embodiments of the present invention will be described with reference to the drawings.

Figure 1:
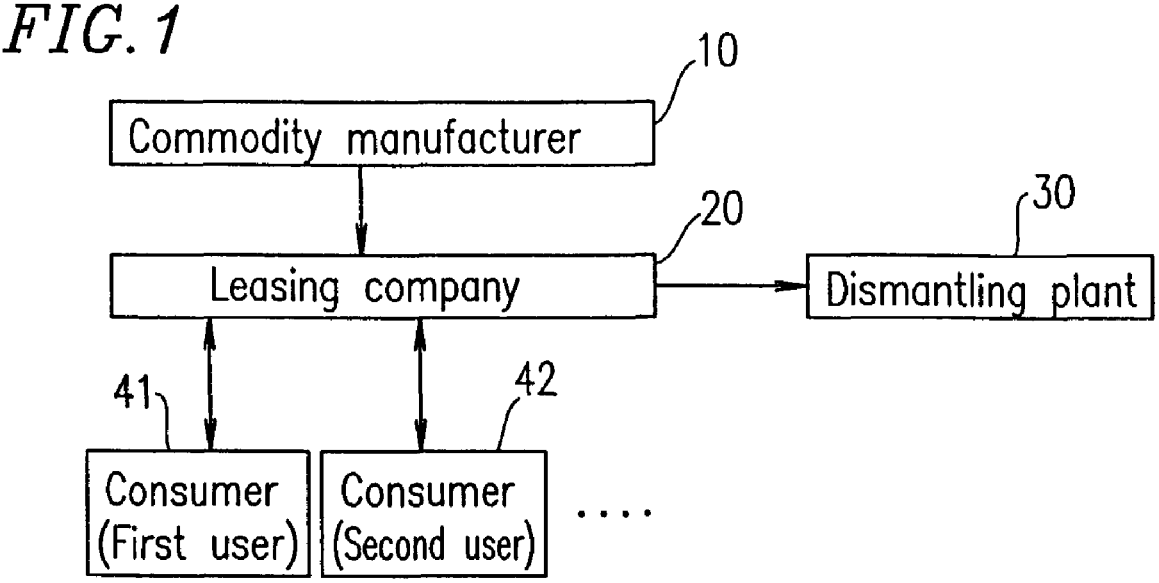
FIG. 1 shows a channel of distribution of commodities based on a recycling method according to the present invention.

FIG. 1 shows a channel of distribution of commodities based on a recycling method according to the present invention.

A commodity manufacturer 10 manufactures commodities. The commodities manufactured by the commodity manufacturer 10 are sold to a leasing company 20.

The leasing company 20 leases the commodity to a consumer (first user) 41 according to lease terms set by a lease contract.

The leasing company 20 collects the commodity from the consumer (first user) 41, for example, after the lease contract has expired. Alternatively, the leasing company 20 may cancel the lease contract at any time and collect the commodity from the consumer (first user) 41. In such a case, it is preferable to pay any lease charges back to the consumer (first user) 41 according to the lease contract.

In addition, it is preferable that the leasing company 20 gives some kind of incentive to the consumer (first user) 41 so as to ensure that the commodity is easily collected from the consumer (first user) 41.

The remaining life of the commodity collected from the consumer (first user) 41 is estimated. Based on the estimated remaining life of the commodity, new lease terms are set. A method for estimating the remaining life of the commodity will be described later.

The leasing company 20 leases the commodity to a consumer (second user) 42 according to the lease terms determined based on the estimated remaining life of the commodity. Typically, the consumer (first user) 41 and the consumer (second user) 42 are different because when the consumer (first user) 41 desires to extend the lease contract, the consumer (first user) 41 usually continues to use the commodity without having it collected. However, the consumer (first user) 41 and the consumer (second user) 42 may be the same.

The leasing company 20 collects the commodity from the consumer (second user) 42, for example, after the lease contract has expired. Alternatively, the leasing company 20 may cancel the lease contract at any time and collect the commodity from the consumer (second user) 42. In such a case, it is preferable to pay any lease charges back to the consumer (second user) 42 according to the lease contract.

In addition, it is preferable that the leasing company 20 gives some kind of incentive to the consumer (second user) 42 so as to ensure that the commodity is easily collected from the consumer (second user) 42.

The commodity collected from the consumer (second user) 42 is determined whether it can be an object of a further lease contract. For example, when the estimated remaining life of the collected commodity is still sufficiently long (i.e., a value indicating the estimated remaining life of the commodity is equal to or greater than a preset threshold), the commodity may be an object of a further lease contract.

Thus, lease and collection are repeated between the leasing company 20 and the consumers 41, 42, . . . any number of times.

Alternatively, when the estimated remaining life of the collected commodity is short (i.e., a value indicating the estimated remaining life of the commodity is less than a preset threshold), the commodity cannot be an object of a further lease contract. In this case, the commodity is sent to a dismantling plant 30 from the leasing company 20. In the dismantling plant 30, the commodity is dismantled into a plurality of parts.

Most of the home appliances which are currently distributed are not designed to accommodate automatic dismantling. Therefore, the commodity is dismantled by a labor-intensive operation in the dismantling plant 30. This increases the operation cost of the dismantling plant 30.

One of the methods for decreasing the operation cost of the dismantling plant 30 contemplated is a method in which the lease company 20 varies the lease terms for leasing the commodity to the consumer, depending on an operating schedule of the dismantling plant 30.

For example, the dismantling plant 30 submits the operating schedule of the dismantling plant 30 to the leasing company 20. The operating schedule of the dismantling plant 30 is determined in view of various specific requirements, such as seasonal factors of laborers.

The lease company 20 varies the lease terms so that an amount of commodities brought to the dismantling plant 30 conforms to a through put capacity of the dismantling plant 30. For example, for the commodity which is to be collected at the time when the throughput capacity of the dismantling plant 30 is decreased, the lease charge is set to be higher than a standard charge. On the other hand, for the commodity which is to be collected at the time when the throughput capacity of the dismantling plant 30 is increased, the lease charge is set to be lower than the standard charge.

Such variable lease terms are different from the conventional terms where the lease charge decreases as the lease period increases.

In order to link the operation schedule of the dismantling plant 30 and the lease terms of the leasing company 20 in a manner as described above, it is preferable that a proprietor of the dismantling plant 30 and that of the leasing company 20 is the same. Alternatively, it is at least preferable that the dismantling plant 30 and the leasing company 20 are in cooperation.

Additionally, the dismantling plant 30 may submit the operating schedule of the dismantling plant 30 to the commodity manufacturer 10.

As the automatic dismantle design technology spreads in the commodity manufacturer 10, the automation of the dismantling plant 30 is promoted because the automatic dismantlement of the commodity is facilitated. As a result, a dismantling operation of the commodity shifts from a labor-intensive operation to a knowledge intensive operation. Thus, the operation cost of the dismantling plant 30 can be decreased.

Furthermore, as the automatic dismantle design technology spreads in the commodity manufacturer 10, the rebuilding of a material in the dismantling plant 30 is promoted. For example, in the dismantling plant 30, a material may be rebuilt from at least one part obtained by dismantling the commodity, or at least a portion of a new commodity may be manufactured from the rebuilt material. Thus, the operation cost of the dismantling plant 30 can be further decreased.

The leasing company 20 shown in FIG. 1 may be replaced with a sales company. In this case, the sales company sells the commodity to the consumer (second user) 42 according to sale terms which are determined based on the estimated remaining life of the commodity. The sales company collects the commodity from the consumer (second user) 42, or the sales company may entrust the collection of the commodity to another company. Alternatively, the leasing company 20 or the sales company may lease and sell the commodities.

Figure 2A:
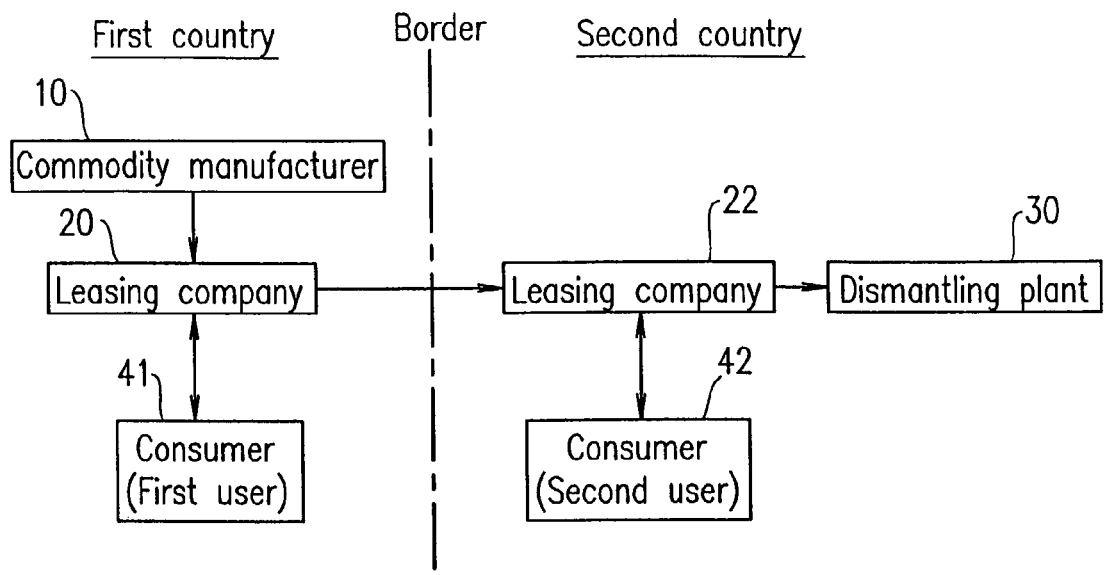
FIG. 2A shows another channel of distribution of commodities based on a recycling method according to the present invention.
Figure 2B:
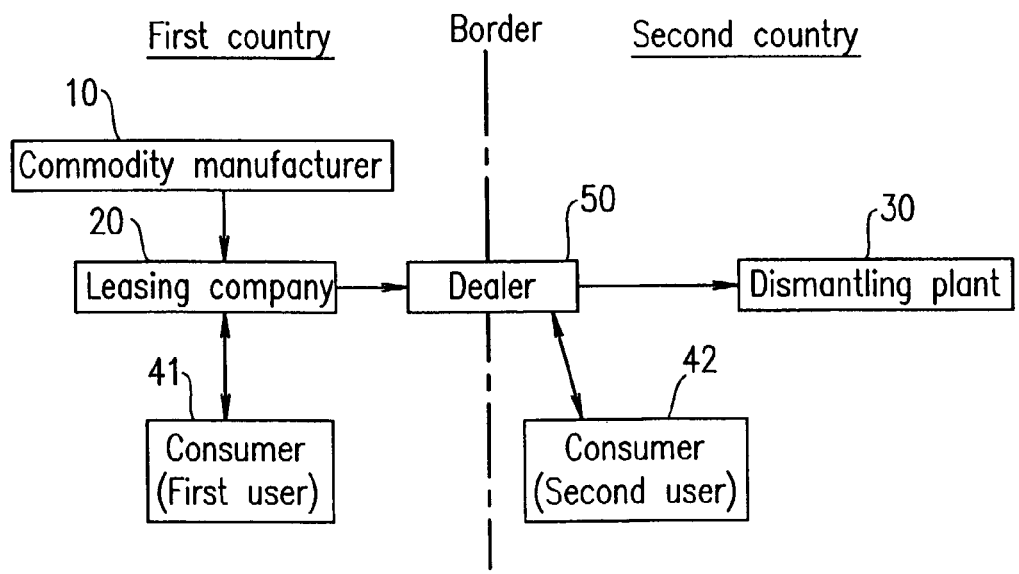
FIG. 2B shows yet another channel of distribution of commodities based on a recycling method according to the present invention.

FIGS. 2A and 2B show other channels of distribution of commodities based on a recycling method according to the present invention.

In an example shown in FIG. 2A, a commodity manufacturer 10 and a leasing company 20 are established in a first country and a leasing company 22 and a dismantling plant 30 are established in a second country. Typically, the first country is a developed country (e.g., Japan). The second country is typically a developing country (e.g., India).

The leasing company 20 in the first country leases a commodity to a consumer (first user) 41 according to preset lease terms and collects the commodity from the consumer (first user) 41.

The commodity collected from the consumer (first user) 41 is exported to the leasing company 22 in the second country for sale or lease in the second country. The commodity collected from the consumer (first user) 41 may be leased and collected in the first country again, and then exported to the leasing company 22 in the second country.

The leasing company 22 in the second country imports the commodity from the first country to the second country, leases the commodity to a consumer (second user) 42, according to lease terms which are determined based on an estimated remaining life of the commodity, and collects the commodity from the consumer (second user) 42. A sale price of the commodity to be leased to the consumer (second user) 42 is preferably about 5 to 10% of that of a brand new product. Such a low price may be a powerful incentive for consumers in the second country (especially, a developing country) to purchase the commodity.

After the commodity is collected from the consumer (second user) 42, the commodity is dismantled in to a plurality of parts in a dismantling plant 30 in the second country.

By establishing the dismantling plant 30 in the second country (especially, a developing country), inexpensive labor which is required for the labor-intensive operation can be more easily provided to the dismantling plant 30. Thus, an operation cost of the dismantling plant 30 can be decreased.

When the dismantling plant 30 is established in the second country (especially, a developing country), it is preferable that techniques for dismantling the commodity are transferred from the first country to the second country, and a guidance on the techniques for dismantling the commodity is provided in the second country. Thus, the technical skill of the laborers in the second country is improved. As a result, the operation cost of the dismantling plant can be further decreased. Moreover, as the industry of dismantling commodities develops in the second country, employment can be created.

The leasing company 20 and the leasing company 22 may be one company, or may be separate companies.

As described above, by distributing used commodities to the second country (especially, a developing country), and dismantling the used commodities in the second country with a technical cooperation of the first country (especially, a developed country), desire of consumers in the second country to purchase the products is satisfied, and techniques of the laborers in the second country improves. Thus, a "global recycling system" across the border is built, which may contribute to the "protection of the environment of the planet".

In an example shown in FIG. 2B, a commodity manufacturer 10 and a leasing company 20 are established in the first country, and a dismantling plant 30 is established in the second country. The example shown in FIG. 2B is identical with the example shown in FIG. 2A except that a dealer 50 which handles export of a commodity from the first country to the second country directly lease the commodity to a consumer (second user) 42.

The examples shown in FIGS. 2A and 2B represent a relationship between two countries, the first country and the second country. However, this relationship can be established among three or more countries. For example, the commodity collected in the first country may be leased in the second country, and the commodity collected in the second country may be leased in the third country, etc.

Each of the leasing companies 20, 22 and the dealer 50 shown in FIGS. 2A and 2B may be replaced with a sales company. In this case, the sales company sells the commodity to the consumer according to sale terms which are determined based on the estimated remaining life of the commodity. The sales company collects the commodity from the consumer, or the sales company may entrust the collection of the commodity to another company. Alternatively, at least one of the leasing companies 20, 22 and the dealer 50 may lease and sell the commodities, or the sales company may lease and sell the commodities.

FIG. 3 is a flow chart illustrating a procedure of the recycling method according to the present invention.

Step S1: Sell or rent a commodity to a first user.

Step S2: Collect the commodity from the first user.

Step S3: Estimate the remaining life of the commodity collected from the first user.

Step S4: Determine sale terms or lease terms based on the remaining estimated remaining life of the commodity.

Step S5: Sell or rent the commodity to a second user according to sale terms or lease terms determined at step S4.

Step S6: Collect the commodity from the second user.

Step S7: Dismantle the commodity into a plurality of parts after the collection of the commodity from the second user.

In the examples shown in FIGS. 2A and 2B, steps S1 and S2 shown in FIG. 3 are performed in the first country, and steps S5, S6, and S7 shown in FIG. 3 are performed in the second country, which is different from the first country.

In the example shown in FIG. 2A, a leasing company 20 performs steps S1 and S2, and then performs a step of exporting commodities collected in step S2. Thereafter, a leasing company 22 performs a step of importing the commodity into the second country which is different from the first country, and then performs steps S5, S6, and S7.

The steps S3 and S4 shown in FIG. 3 may be omitted.

Figure 4:
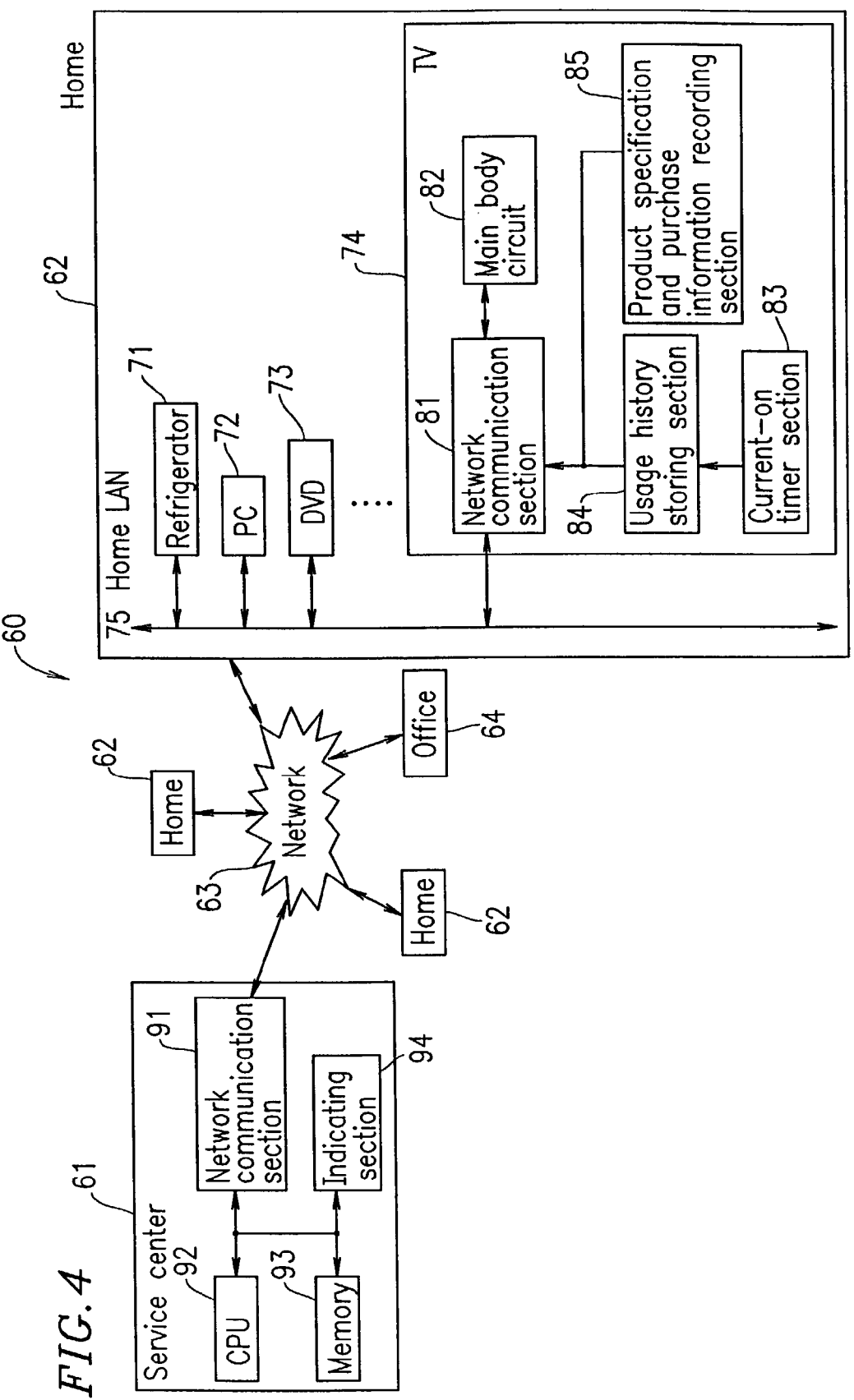
FIG. 4 shows a structure of a recycle support system 60 supporting the recycling of commodities.

FIG. 4 shows a structure of a recycle support system 60 supporting the recycling of commodities.

The recycle support system 60 comprises a service center 61, a home 62, and a network 63 connecting the service center 61 and the home 62. An office 64 may be connected to the network 63. The network 63 may be any type of network (e.g., the Internet).

The service center 61 may be provided in, for example, the leasing company 20 (FIG. 1).

Consumers reside in the home 62. In the home 62, there is equipment (information appliances), such as a refrigerator 71, a personal computer (PC) 72, a DVD recording and playing device (DVD) 73, a television (TV) 74, and the like. The equipment are connected to each other via a home LAN 75 provided in the home 62.

The TV 74 comprises a network communication section 81 having a function of communicating with the service center 61 via the network 63, a main body circuit 82 for implementing the functions of the TV 74, a current-on timer section 83 for timing a total current-on time of the TV 74, a usage history information storing section 84 for recording the total current-on time timed by the current-on timer section 83, and a product specification and purchase information recording section 85 for recording product specification information and purchase information of the TV 74.

The product specification information of the TV 74 is recorded in the product specification and purchase information recording section 85 when the TV 74 is shipped. The product specification information of the TV 74 includes a name of the manufacturer, category of the product, name of the model, manufacture date, serial number, and the like.

The purchase information of the TV 74 is recorded in the product specification and purchase information recording section 85 when the consumer purchases the TV 74 (or when the consumer begins leasing the TV 74). The purchase information of the TV 74 includes the date of purchase of the TV 74 by the consumer (or the date on which the consumer begins leasing the TV 74), and the like.

The current-on timer section 83 is implemented by, for example, a timer which starts when power is supplied to then TV 74 for operation. An accumulated value of the total current-on time of the TV 74 can be calculated based on the values timed by the timer. The accumulated value of the total current-on time of the TV 74 may be stored in the usage history information storing section 84 as the usage history information.

Alternatively, the number of times power is supplied to the TV 74 and is shut off may be stored in the usage history information storing section 84 as the usage history information.

The usage history information recorded in the usage history information storing section 84 and the product specification information and purchase information recorded in the product specification and purchase information recording section 85 are sent to the service center 61 via the network 63 to be stored in a memory 93 in the service center 61.

A CPU 92 estimates the remaining life of the TV 74 based on the usage history information (e.g., the accumulated value of the total current-on time of the TV 74) stored in the memory 93. The greater the accumulated value of the total current-on time of the TV 74, the shorter the estimated remaining life of the TV 74, and the smaller the accumulated value of the total current-on time of the TV 74, the longer the estimated remaining life of the TV 74. In addition to the accumulated value of the total current-on time of the TV 74, information regarding the existence of any problems with the TV 74 or the extent such problems may also be considered when the remaining life of the TV 74 is estimated.

Alternatively, the CPU 92 may estimate the remaining life of the TV 74 based on the product specification information (e.g., manufacture date) stored in the memory 93. For example, the greater the difference between the current date and the manufacture date (i.e., current date minus manufacture date), the shorter the estimated remaining life of the TV 74, and the smaller the difference between the current date and the manufacture date (i.e., current date minus manufacture date), the longer the estimated remaining life of the TV 74. The current date may be obtained by using, for example, a clock mechanism (not shown) incorporated in the CPU 92.

Thus, the remaining life of the commodity pan be estimated. Of course, the method for estimating the life of the commodity is not limited to the method described above. Any method for estimating the life of the commodity may be applied at step S3 shown in FIG. 3.

The communication between the service center 61 and the home 62 is performed, for example, by transmitting packets of information. A packet includes a header portion indicating an address to which the packet is transmitted and a data portion including information to be transmitted. The header portion includes an equipment identification number assigned to each piece of equipment in the home 62, and a home identification number assigned to each home. By forming the header portion having such a structure, packets can be sent from the service center 61 to particular equipment in the home 62, or, conversely, packets can be sent from particular equipment in the home 62 to the service center 61. In order to achieve this, each piece of equipment in the home 62 may communicate with the service center 61, or each piece of equipment in the home 62 may communicate with the service center 61 via a particular piece of equipment (e.g., the PC 72).

The CPU 92 determines the sale terms and lease terms based on the estimated remaining life of the commodity. For example, the shorter the estimated remaining life of the commodity, the lower the sales or rental price, and the longer the estimated remaining life of the commodity, the higher the sales or rental price. Alternatively, the shorter the estimated remaining life of the commodity, the shorter the lease period, and the longer the estimated remaining life of the commodity, the longer the lease period.

Thus, the sale terms and the lease terms are determined based on the estimated remaining life of the commodity. Of course, the method for determining the sale terms and the lease terms is not limited to the method described above. Any method for determining the sale terms and the lease terms based on the estimated remaining life of the commodity may be applied at step S4 shown in FIG. 3.

By constructing an environment in which the service center 61 and the home 62 are connected to each other via the network 63, as shown in FIG. 4, the sale terms and the lease terms can be determined based on the estimated remaining life of the TV 74 before the TV 74 is actually collected. Thus, when the consumer requests the service center 61 to buy the TV 74 from the consumer, it is possible to estimate the price of TV 74 without actually moving the TV 74.

The sale terms and the lease terms may also be determined after the TV 74 is collected, based on the estimated remaining life of the TV 74, by directly connecting the network communication section 81 of the TV 74 and the network communication section 91 of the service center 61 without the network 63.

Alternatively, the usage history information may be read from the usage history information storing section 84, or the product specification information and the purchase information may be read from the product specification and the purchase information recording section 85 without passing through the network communication section 81.

Figure 5:
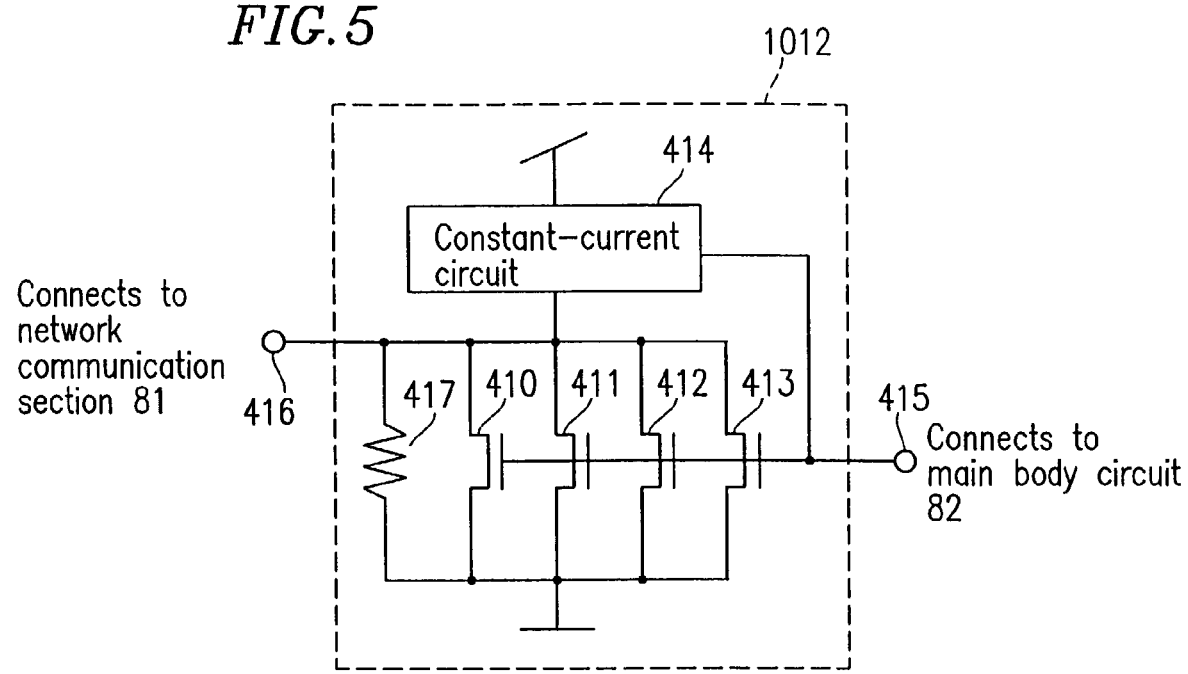
FIG. 5 shows a device 1012 having both the function of a usage history information storing section 84 and the function of a current-on timer section 83 shown in FIG. 4.

FIG. 5 shows a device 1012 having both the function of the usage history information storing section 84 and the function of the current-on timer section 83 shown in FIG. 4. The recording device 1012 is a disposal type device which is replaceable. The recording device 1012 is incorporated in the TV 74.

The recording device 1012 comprises a constant-current circuit 414, MOS transistors 410 to 413, a terminal 415 which is connected to the main body circuit 82 (FIG. 4), a terminal 416 which is connected to the network communication section 81, and a resistor 417.

The recording device 1012 receives a control signal from the main body circuit 82 via the terminal 415. The control signal is input to the constant-current circuit 414 and respective gates of the MOS transistors 410 to 413. When power is supplied to the TV 74 (i.e., current starts flowing into the TV 74), the control signal goes to a high level. Thus, the constant-current circuit 414 and the MOS transistors 410 to 413 are turned on, and currents flow through the sources and drains of the MOS transistors 410 to 413.

When the power to the TV 74 is shut off (i.e., current stops flowing to the TV 74), the control signal goes to a low level. Thus, the constant-current circuit 414 and the MOS transistors 410 to 413 are turned off, and currents do not flow through the sources and drains of the MOS transistors 410 to 413. Therefore, current flows through each of the MOS transistors 410 to 413 only during the current-on time of the TV 74.

Each of the MOS transistors 410 to 413 deteriorates after different predetermined periods of time (e.g., a breakdown of a gate oxide film of the MOS transistor occurs), and do not function as the MOS transistor any more. For example, the MOS transistors 410 to 413 are designed such that the breakdowns of the gate oxide films occur when the total current-on time of the TV 74 is respectively 10,000 hours, 5,000 hours, 1,000 hours, and 500 hours. Such a design can be achieved by adjusting materials for the gate oxide films. When the total current-on time of the TV 74 is 2,000 hours, the breakdown of the gate oxide films of the MOS transistors 412 and 413 have already occurred.

The potential at the terminal 416 can be read by the network communication section 81. The read potential is sent to the service center 61 via the network 63 as information indicating the accumulated value of the total current-on time of the TV 74. Thus, the service center 61 obtains the usage history information of the TV 74 via the network 63, and estimates the remaining life of the TV 74 based on the usage history information.

Since it is difficult to restore the gate oxide films of the MOS transistors after breakdown, with the recoding device 1012, it is substantially impossible for the user (e.g., the first user) of the TV 74 to alter the information indicating the accumulated value of the total current-on time of the TV 74.

As described above, the recording device 1012 functions as a recording section for recording the information indicating the accumulated value of the total current-on time of the TV 74 (information indicating the usage history of the TV 74) in a manner in which it is impossible for the user to alter.

However, such a recording section may not be provided as a separate circuit from the main circuit of the TV 74. For example, a display screen of the TV 74 deteriorates irreversibly in accordance with the usage history of the TV 74. Thus, the display screen of the TV 74 may be used as a recording section for recording the information indicating the usage history of the TV 74 in a manner in which it is impossible for the user to alter. In this case, for example, after the collection of the TV 74, a particular test pattern may be projected on the display screen of the TV 74, and based on the resolution thereof, the remaining life of the TV 74 may be estimated according to a sensory criteria. The remaining life of the TV 74 may also be estimated by image processing of the projected test pattern and using an expert system constructed by programming such a sensory criteria.

If the first user has not ever used the TV 74 for some reason after it is sold or rented to the first user until the TV 74 is collected, the TV 74 is sold or rented to the second user in an almost brand-new condition. In this case, it is preferable that the sale terms or lease terms of the TV 74 to the second user are determined based on the fact that the TV 74 is unused. For example, it is preferable to set a high sale price or the rental price of the TV 74 to the second user. For this purpose, a device for irreversibly recording the information regarding whether the TV 74 is unused or not may be provided in the TV 74.

Figure 6A:
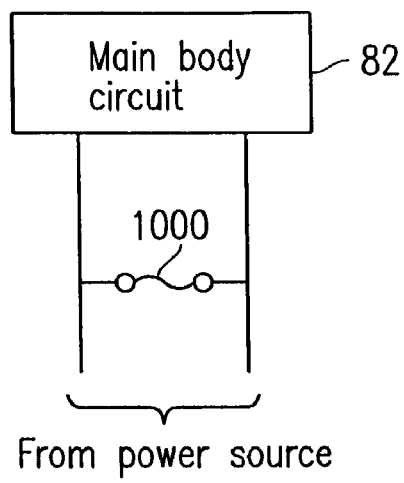
FIG. 6A shows a fuse 1000, as an example of the device for irreversibly recording information regarding whether a TV 74 is unused or not.

FIG. 6A shows a fuse 1000, as an example of the device for irreversibly recording the information regarding whether the TV 74 is unused or not. The fuse 1000 is provided on a wire which connects the main body circuit 84 of the TV 74 and a power source. The fuse 1000 breaks when voltages above the predetermined voltage are applied to both ends thereof. The predetermined voltage is adjusted to be lower than the voltage required for operating the main body circuit 84 of the TV 74.

Figure 6B:
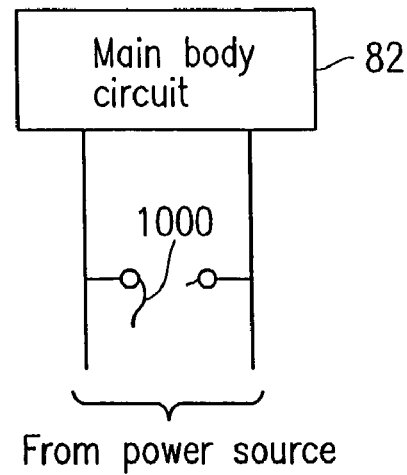
FIG. 6B shows a condition of the fuse 1000 after the TV 74 is used.

FIG. 6B shows a condition of the fuse 1000 after the TV 74 is used. When the TV 74 is used (i.e., the TV 74 is connected to the power source), the fuse 1000 breaks. Since the broken fuse cannot be restored, the fuse 1000 functions as the device for irreversibly recording information regarding whether the TV 74 is unused or not. After the collection of the TV 74, the condition of the fuse 1000 is examined, and when the fuse 1000 is not broken, it is recognized that the TV 74 is unused.

In order to remove surges or pulses occurring when the fuse 100 breaks, a protective device 110 may be provided in the TV 74.

Figure 6C:
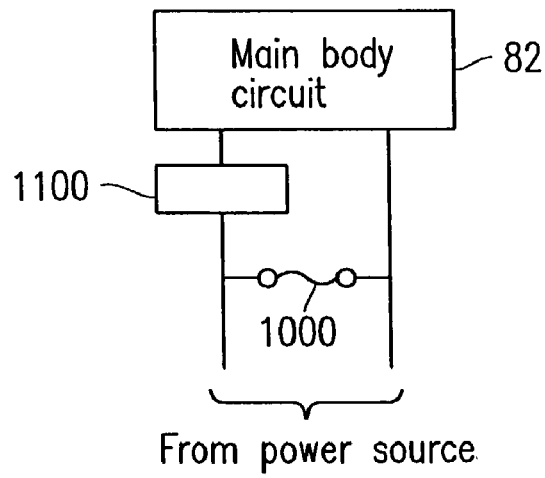
FIG. 6C shows an example in which a protective device 1100 is provided in the TV 74.

FIG. 6C shows an example in which the protective device 1100 is provided in the TV 74. For the protective device 1100, any type of circuit which is capable of removing surges or pulses occurring when the fuse 1000 breaks may be used. By providing such a protective device 1100, the main body circuit 82 can be protected against a bad influence of the surges and pulses.

In the examples shown in FIGS. 4, 5, and 6A to 6C, explanation has been made with reference to the TV 74 for an example of the commodity. Similar explanation can be applied to information appliances and other commodities, such as, the refrigerator 71, the PC 72, the DVD 73, and the like.

In order to efficiently recycle a commodity, a life cycle of the commodity, from the manufacture to the disposal, must be managed. A method for managing a life cycle of the commodity is explained below.

It is preferable that the commodity comprises a device for sending particular information which is particular to the commodity (e.g., the product specification information described above). The particular information may be sent at a periodic interval or may be sent irregularly.

For example, in the case where the product specification and purchase information recording section 85 and the network communication section 81 are incorporated in the TV 74 as shown in FIG. 4, the product specification information recorded in the product specification and purchase information recording section 85 may be sent as the particular information.

The product specification information sent from the TV 74 is stored in the memory 93 in the service center 61 via the network 63. Thus, the commodity can be managed by collecting the particular information particular to the commodity and storing the particular information in the service center 61.

The commodity is not always connected to a network, such as the wired connection to the network 63. Therefore, it is preferable that the device for sending the particular information of the commodity is formed to send the particular information of the commodity in a wireless manner. Furthermore, the particular information which is sent in a wireless manner may be received by a communications satellite.

Figure 7:
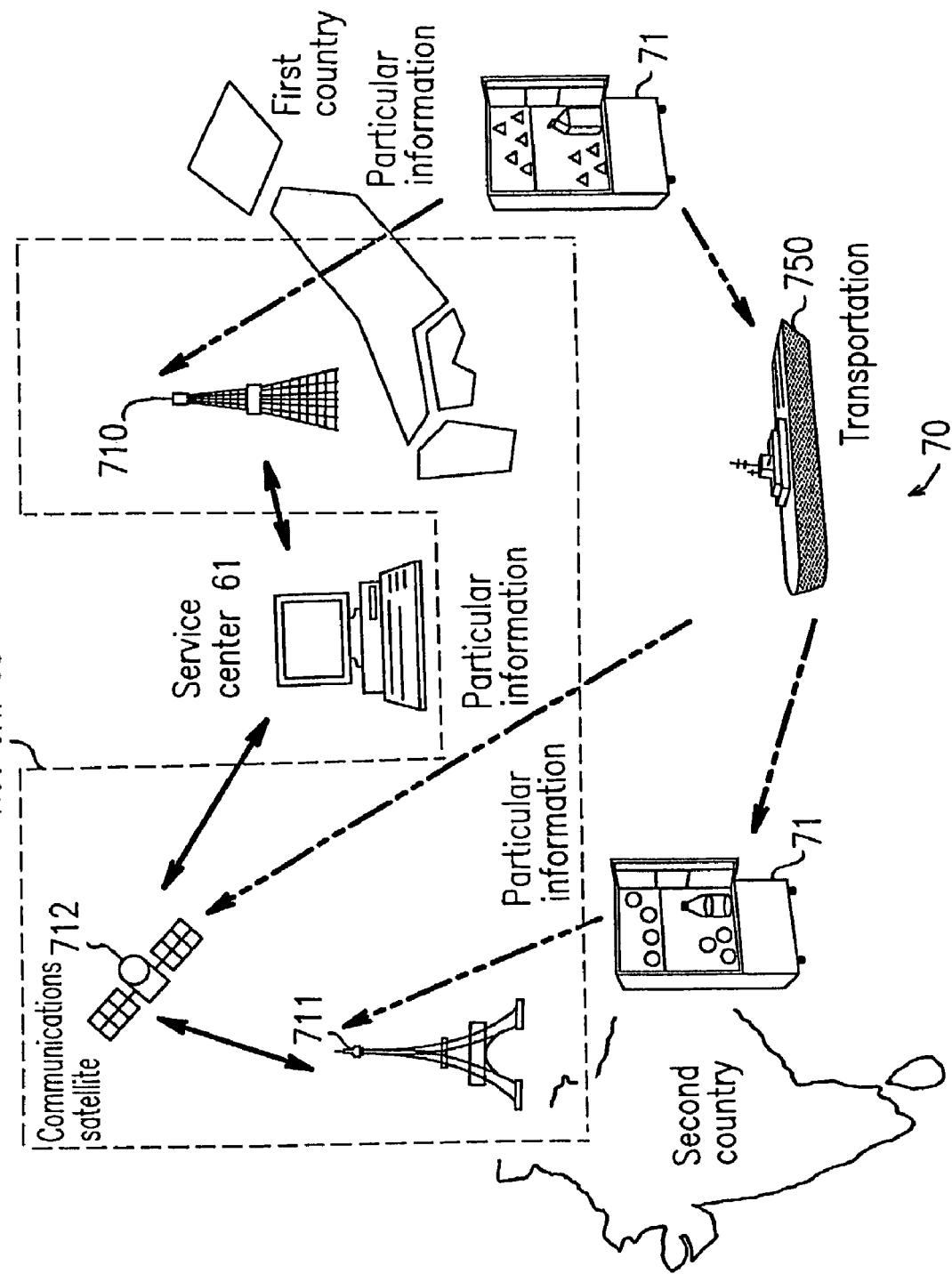
FIG. 7 shows an example of a management system 70 for managing life cycles of commodities on a global scale by using communications satellites.

FIG. 7 shows an example of a management system 70 for managing life cycles of commodities on a global scale by using communications satellites. In FIG. 7, the like reference numerals indicate like elements as shown in FIG. 4, and the description thereof is omitted. In the example shown in FIG. 7, a refrigerator 71 is sold or rented to a first user in a first country (Japan), then collected and sent to a second country (India). The refrigerator 71 is sold or rented to a second user in the second country.

In the example shown in FIG. 7, the network 63 includes a first country station 710, a second country station 711, and a communications satellite 712. The refrigerator 71 comprises a device for sending particular information of a commodity, which is formed to send the particular information of the commodity in a wireless manner.

When the refrigerator 71 is used in the first country, the particular information of the refrigerator 71 is sent to the service center 61 via the station 710. Herein, the service center 61 is assumed to be in the first country. When the refrigerator 71 is used in the second country, the particular information of the refrigerator 71 is sent to the service center 61 via the station 711 and the communications satellite 712. When the refrigerator 71 is loaded in a ship 750 transporting the refrigerator 71 from the first country (Japan) to the second country (India), the particular information of the refrigerator 71 is sent to the service center 61 via the communications satellite 712.

In the example shown in FIG. 7, the explanation is made with reference to the refrigerator 71 as an example of the commodity. Similar explanation can be applied to information appliances and other commodities, such as the PC 72, the DVD 73, the TV 74, and the like shown in FIG. 4.

By constructing the network 63 as shown in FIG. 7, the particular information of the commodity can be collected and stored in the service center 61 irrespective of the location of the commodity.

An amount of information required for the communication of the particular information of the commodity is small. Therefore, the particular information of the commodity can be collected and stored in the service center 61 with a significantly low cost.

Further, in the case where the particular information of the commodity includes distribution information for specifying a party involved in the distribution of the commodity (e.g., the purchaser of the commodity, user of the leased commodity, supervisor in the transportation of the commodity, supervisor in exporting the commodity, supervisor in importing the commodity, and the like), when the particular information from the commodity ceases, the party involved in the distribution of the commodity, specified by the distribution information included in the most recent piece of particular information sent from the commodity, may be notified that the particular information from the commodity ceases. Along with the notification, a responsibility for collecting the commodity may be placed on the party involved in the distribution of the commodity.

Thus, responsibilities for managing the commodity can be defined at any point in the life cycle of the commodity. As a result, it is possible to prevent the commodity from being illegally disposed of, for example, in the sea or in a field.

The particular information may include the information regarding the country in which the commodity is manufactured, and/or the information regarding the manufacturer of the commodity. When an illegal disposal of the commodity occurs, at least a part of the responsibility may be placed on the country in which the commodity is manufactured and/or the manufacturer of the commodity.

The particular information may include information for specifying a country which is suitable for dismantling the commodity. The country is specified based on, for example, achievements in transfer of the techniques for dismantling the commodity from the country in which the commodity is manufactured. Thus, the global management of the life cycles of the commodities can be efficiently performed.

In the examples shown in FIGS. 2A and 2B, manufacture of the commodity and the sale and renting of the commodity to the first user are performed in the first country, and the sale and renting to the second user are performed in the second country. However, the manufacture of the commodity, and the sale and renting to the first user of the commodity may be performed in different countries. Furthermore, the sale and renting to the second user, and the dismantling of the commodity may be performed in different countries. Hereinafter, the country in which the commodity is manufactured is referred to as the country of manufacture, the country in which the sale and renting to the first user is performed is referred to as the country of first use, the country in which the sale and renting to the second user is performed is referred to as the country of second use, and the country in which dismantling is performed is referred to as the country of dismantling.

Figure 8A:
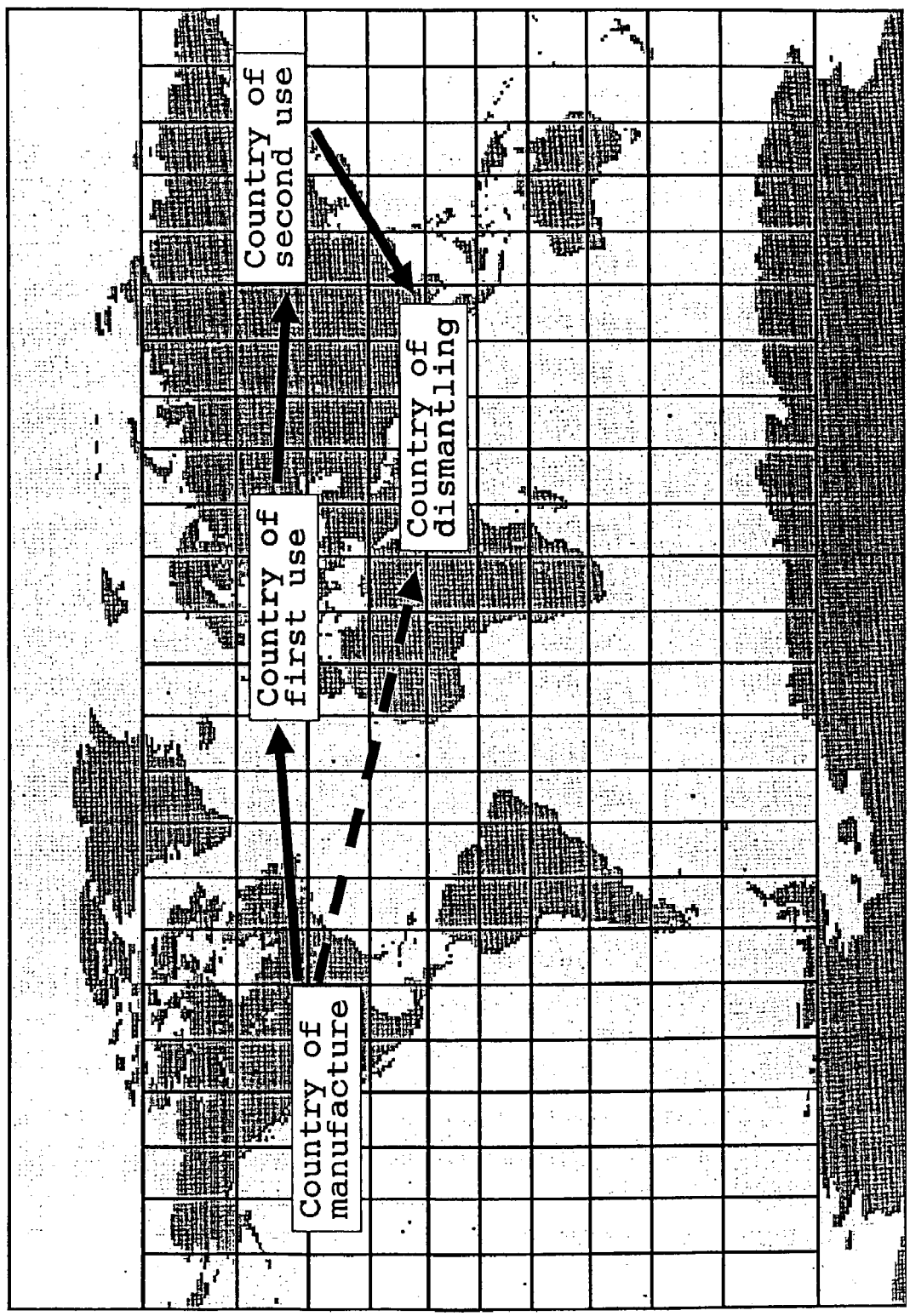
FIG. 8A shows an example of communication channels of commodities in the life cycles of the commodities.

FIG. 8A shows an example of communication channels of commodities in the life cycles of the commodities. In the example shown in FIG. 8A, a commodity produced in the country of manufacture is sent to the first country, and is sold or rented to the first user in the first country. The commodity is collected from the first user, then sent to the second country, and is sold or rented to the second user in the second country. The commodity is collected from the second user, sent to the country of dismantling, and is dismantled. The techniques for dismantling the commodity is transferred from the country of production to the country of dismantling.

In FIGS. 8A to 8D, the solid line arrows represent a channel of distribution, and the broken line arrow represents a channel of transferring the techniques for dismantling the commodity.

Hereinafter, with reference to FIGS. 8B to 8D, specific examples of the channels of distribution of the commodities are shown for each of the types of commodity.

Figure 8B:
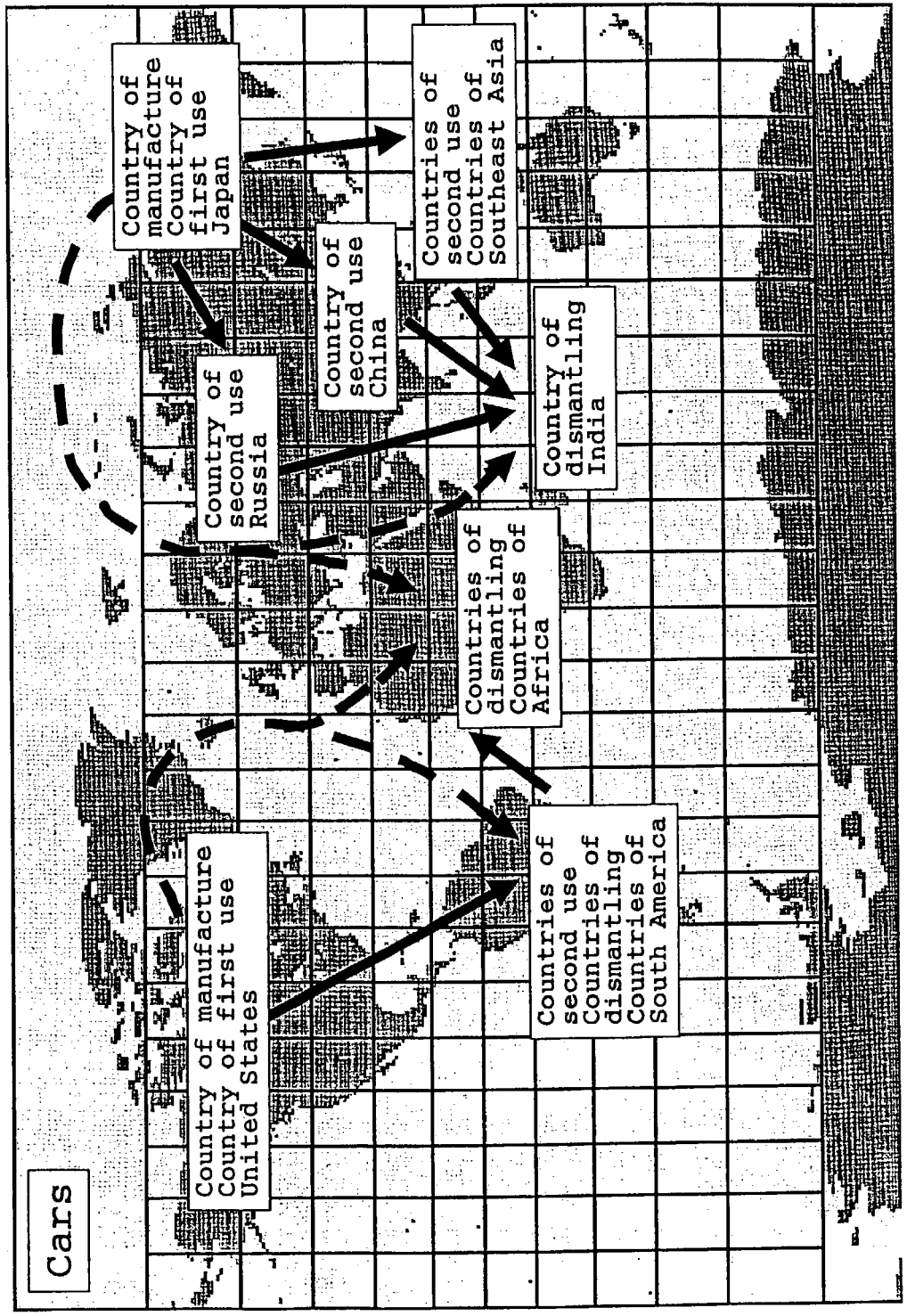
FIG. 8B shows an example of the channel of distribution of a commodity in the case where the commodity is a car.

FIG. 8B shows an example of the channel of distribution of the commodity in the case where the commodity is a car.

A car manufactured in Japan is used by the first user in Japan. The car is collected from the first user, and exported to China, Russia, or the countries of Southeast Asia as a used car. The car is used by the second user in one of these countries, and then sent to the country of dismantling, which can provide a labor-intensive operation (e.g., India, the countries of Africa, and the like).

A car manufactured in the United States is used by the first user in the United States. A number of the cars collected from the first user are used in the United States as used cars. Some of the cars collected from the first user are exported to, for example, the countries of South America to be sold or rented. The car is used by the second user in the countries of South America, and then dismantling is performed in the countries of South America, or the countries of Africa, which can provide the labor-intensive operation.

In order to appropriately manage the life cycles of the cars over the channel of distribution shown in FIG. 8B, the management system 70 which is described with reference to FIG. 7 may be used.

Further, it is preferable that techniques for dismantling the cars are transferred from Japan to the countries of dismantling, such as India, the countries of Africa, and the like. Similarly, it is preferable that techniques for dismantling the cars are transferred from the United States to the countries of dismantling, such as the countries of South America, the countries of Africa, and the like.

Figure 8C:
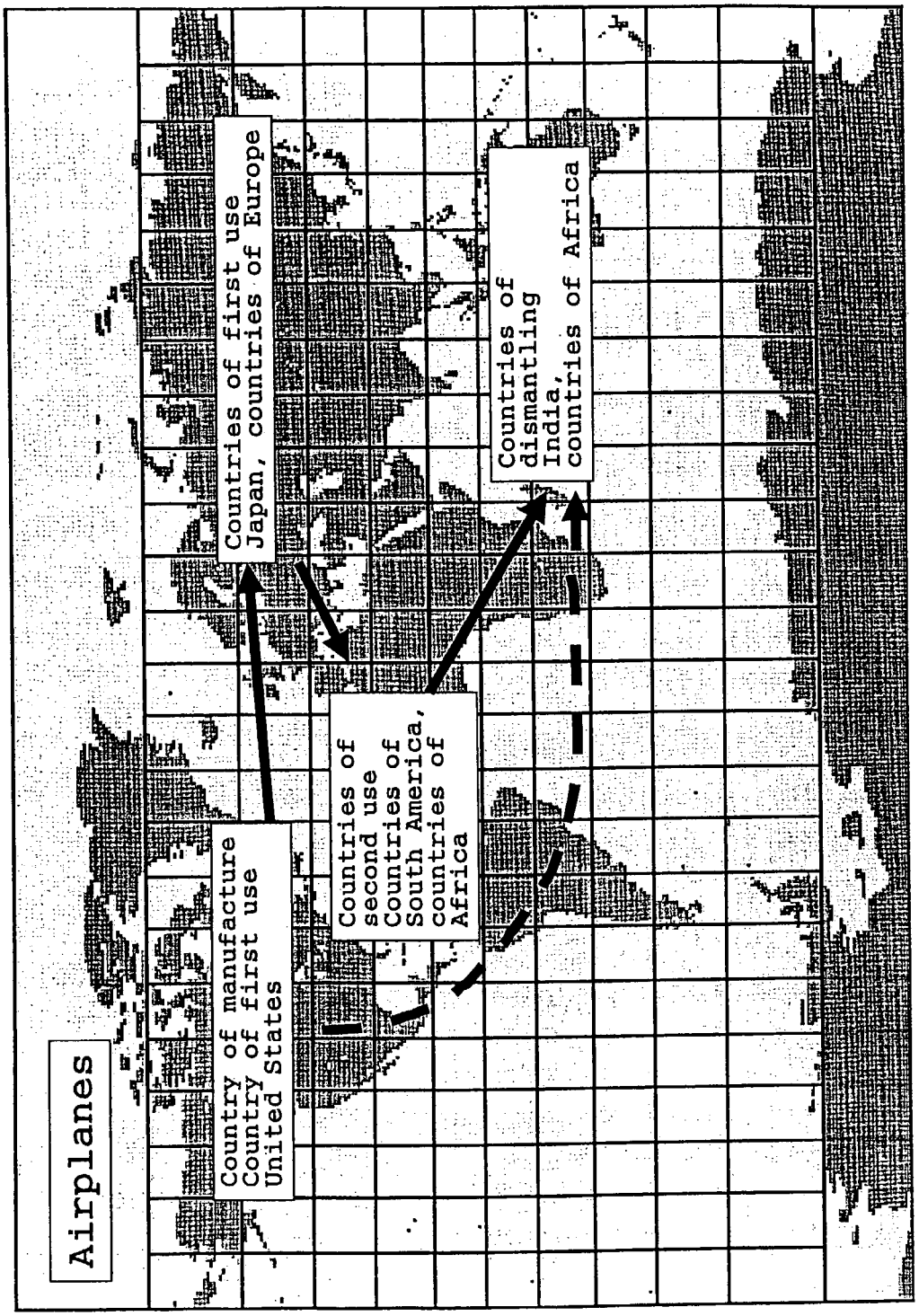
FIG. 8C shows an example of the channel of distribution of a commodity in the case where the commodity is an airplane.

FIG. 8C shows an example of the channel of distribution of the commodity in the case where the commodity is an airplane.

An, airplane manufactured in the United States is used by the first user in the United States, Japan, the countries of Europe, or the like. The Airplane is collected from the first user, and then used by the second user in the countries of South America, or the countries of Africa. Finally, the airplane which has reached its dismantling age is dismantled in the country which can provide the labor-intensive operation, such as India, the countries of Africa, and the like. Before dismantling the airplane in the country of dismantling (e.g., India), the airplane may be sold or rented to a user again in the country of dismantling.

In order to appropriately manage the life cycles of the airplanes over the channel of distribution shown in FIG. 8C, the management system 70 which is described with reference to FIG. 7 may be used.

Further, it is preferable that techniques for dismantling the airplanes are transferred from the United States to the countries of dismantling, such as India, the countries of Africa, and the like.

Figure 8D:
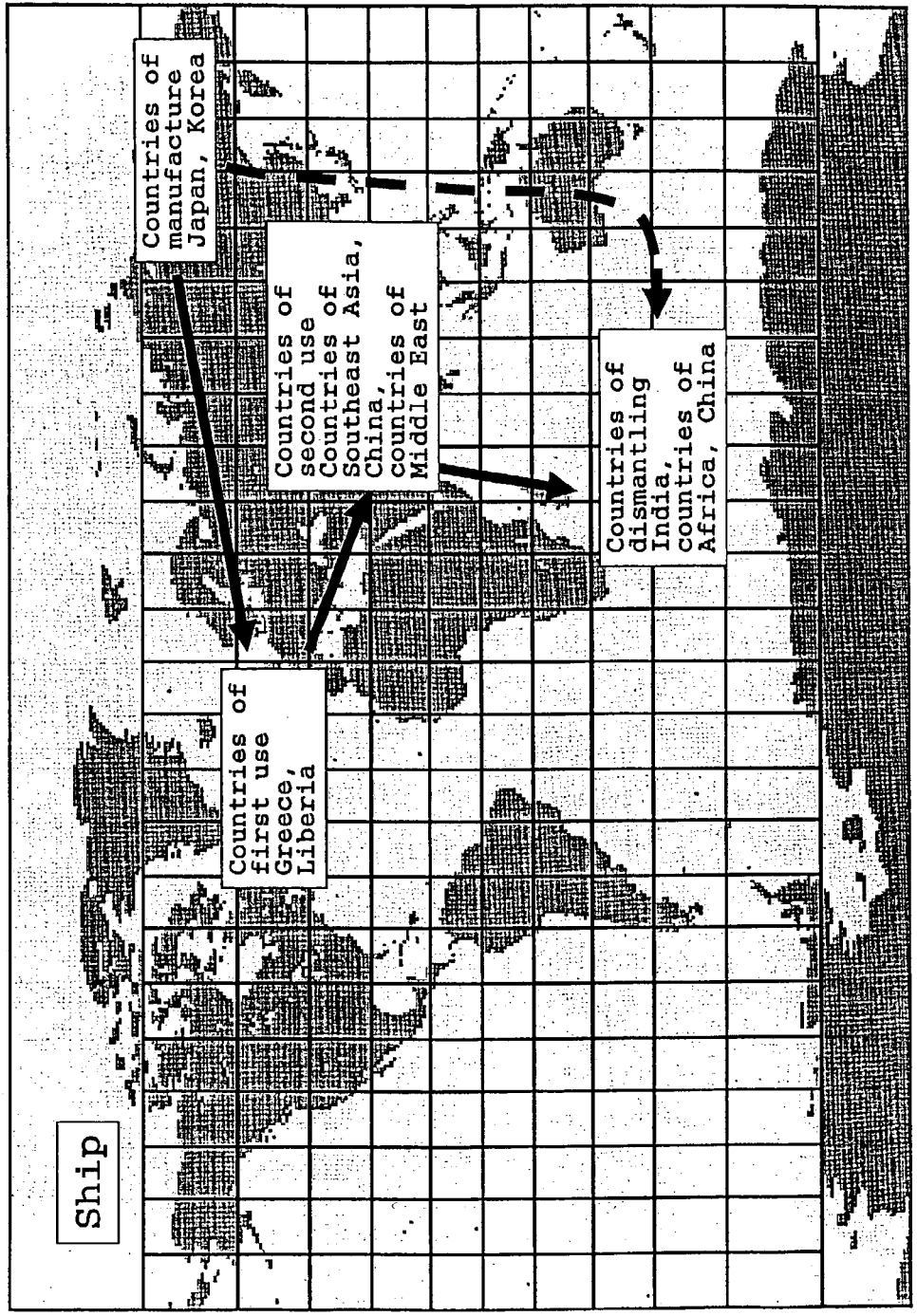
FIG. 8D shows an example of the channel of distribution of a commodity when the commodity is a ship.

FIG. 8D shows an example of the channel of distribution of the commodity when the commodity is a ship.

Japan and Korea are examples of the countries of the manufacture of the ship. A ship manufactured in one of these countries of manufacture is used by a first user in Greece or Liberia (i.e., with Greek registration or Liberian registration). Then, the ship is used by the second user as a used ship in China, the countries of Southeast Asia, the countries of Middle East, and the like. Finally, the ship is sent to India, the countries of Africa, or China, which can provide the labor-intensive operation for dismantling the ship.

In order to appropriately manage the life cycles of the ship over the channel of distribution shown in FIG. 8D, the management system 70 which is described with reference to FIG. 7 may be used.

Further, it is preferable that techniques for dismantling the ship are transferred from Japan or Korea to the countries of dismantling, such as India, the countries of Africa, China, and the like.

The airplanes and ships are formed of a large number of parts. It is preferable that a device for sending particular information is provided in every major part of the airplanes and the ships. Thus, the life cycle of each of the major parts can be managed.

INDUSTRIAL APPLICABILITY

As described in detail above, according to the present invention, a commodity collected from a first user is sold or rented to a second user in accordance with terms which are determined based on an estimated remaining life of the commodity. Thus, it is possible to make use of the commodity for the total length of the life of the commodity. As a result, an amount of commodities to be dismantled is decreased, and an operation cost of the dismantling plant can be decreased. Moreover, two parties can have an appropriate negotiation for the sale and renting of the commodity in view of the life of an individual commodity.

According to the present invention, sale and rental of the commodity to the first user and the collection of the commodity from the first user are performed in a first country (e.g., a developed country), and sale and rental of the commodity to the second user and the collection of the commodity from the second user are performed in a second country, which is different from the first country (e.g., a developing country). Dismantling of the commodity into a plurality of parts is performed in the second country. Thus, a global recycling system for efficiently recycling commodities on a global scale can be implemented

The invention claimed is:

1. A television comprising:
   a current-ON timer, the current-ON timer having a transistor with a predetermined lifetime,
   wherein when a power is supplied to the television, the transistor is in an ON state,
   the current-ON timer is configured to record information indicating whether the total current-ON time of the television has exceeded the predetermined lifetime of the transistor, for estimating a remaining life of the television.

2. The television according to claim 1, wherein the television comprises a communication means and transmits the recorded information indicating whether the total current-ON time of the television has exceeded the predetermined lifetime of the transistor outside of the television.

3. The television according to claim 1, characterized in that:
   the transistor comprises a gate, a source and a drain;
   the source or the drain of the transistor is connected to a constant-current circuit; and
   when the power is supplied to the television, a control signal is input to the gate to have the transistor in the ON state.

4. The television according to claim 1, characterized in that the current-ON timer comprising a plurality of transistors with different predetermined lifetimes, wherein the plurality of transistors are arranged in parallel.

5. The television according to claim 3, characterized in that the current-ON timer comprising a plurality of transistors with different predetermined lifetimes, wherein the plurality of transistors are arranged in parallel.

6. A lifetime estimating method of a television, wherein the television comprises a current-ON timer, the current-ON timer having a transistor with a predetermined lifetime, the current-ON timer being configured to record information indicating whether the total current-ON time of the television has exceeded the predetermined lifetime of the transistor, the method comprising:
   turning on the transistor such that the transistor is in the ON state when a power is supplied to the television: and,
   estimating a remaining life of the television using the information indicating whether the total current-ON time of the television has exceeded the predetermined lifetime of the transistor.

7. The lifetime estimating method of the television according to, claim 6, wherein the television comprises a communication means, further comprising:
   transmitting, by the television, the recorded information indicating whether the total current-ON time of the television has exceeded the predetermined lifetime of the transistor outside of the television to estimate the remaining life of the television outside.

* * * * *